United States Patent
Liang et al.

(10) Patent No.: US 9,690,333 B2
(45) Date of Patent: Jun. 27, 2017

(54) SUPPORTING DEVICE AND PORTABLE ELECTRONIC APPARATUS ASSEMBLY

(71) Applicant: Wistron Corporation, New Taipei (TW)

(72) Inventors: Chen-Yi Liang, New Taipei (TW); Che-Wen Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 77 days.

(21) Appl. No.: 14/569,804

(22) Filed: Dec. 15, 2014

(65) Prior Publication Data

US 2015/0338889 A1 Nov. 26, 2015

(30) Foreign Application Priority Data

May 23, 2014 (TW) .............................. 103118175 A

(51) Int. Cl.
*G06F 1/00* (2006.01)
*G06F 1/16* (2006.01)
*E05D 7/12* (2006.01)

(52) U.S. Cl.
CPC ............ *G06F 1/1681* (2013.01); *E05D 7/12* (2013.01); *G06F 1/1626* (2013.01); *G06F 1/1632* (2013.01); *G06F 1/1654* (2013.01); *G06F 1/1669* (2013.01); *E05D 2007/128* (2013.01); *E05Y 2900/606* (2013.01)

(58) Field of Classification Search
None
See application file for complete search history.

(56) References Cited

U.S. PATENT DOCUMENTS 8,644,018 B2  2/2014  Hung
2004/0212954 A1 * 10/2004 Ulla .................. G06F 1/1626
                                                                                361/679.09

(Continued)

FOREIGN PATENT DOCUMENTS

TW  M464979  11/2013

OTHER PUBLICATIONS

Office action mailed on Dec. 28, 2015 for the Taiwan application No. 103118175, filing date: May 23, 2014, p. 2 line 22-26, p. 3-8 and p. 9 line 1-23.

*Primary Examiner* — Courtney Smith
*Assistant Examiner* — Zhengfu Feng
(74) *Attorney, Agent, or Firm* — Winston Hsu

(57) ABSTRACT

A portable electronic apparatus assembly includes a tabular electronic device and a supporting device. The supporting device includes a base, a connecting member pivotally connected to the base, and a supporting member pivotally connected to the connecting member. The connecting member can rotate about a first rotation axis relative to the base. The supporting member can rotate about a second rotation axis relative to the connecting member. The first rotation axis and the second rotation axis are nonparallel. The supporting device can support the tabular electronic device by accommodating the tabular electronic device in an accommodating slot of the supporting member. Thereby, unfolding and folding of the supporting member relative to the base is more flexible. The whole thickness of the supporting device after folded can avoid being restrained by the thickness of the tabular electronic device.

19 Claims, 8 Drawing Sheets

(56) References Cited

U.S. PATENT DOCUMENTS

2007/0076363 A1\* 4/2007 Liang ................... G06F 1/1601
　　　　　　　　　　　　　　　　　　　　361/679.29
2013/0170131 A1\* 7/2013 Yen ...................... G06F 1/1632
　　　　　　　　　　　　　　　　　　　　361/679.44
2014/0362504 A1\* 12/2014 Liang ................... A45C 11/00
　　　　　　　　　　　　　　　　　　　　361/679.3

\* cited by examiner

SUPPORTING DEVICE AND PORTABLE ELECTRONIC APPARATUS ASSEMBLY

BACKGROUND OF THE INVENTION

1. Field of the Invention

The invention relates to a supporting device, and especially relates to a supporting device for a tabular electronic device.

2. Description of the Prior Art

Tablet computers are widely used. In a common use situation, a user needs one hand to hold a tablet computer and uses the other hand to perform touch operation on a touch screen of the tablet computer. Sometimes, the tablet computer maybe needs to be supported on a table. For example, the tablet computer needs to be connected with another electronic device or functions as a display; even just the user does not want to hold it by hand. For these cases, an independent supporting device or an input device combined with a supporting structure is usually used. The supporting structure of the above devices is mostly provided in form of a simple fixed frame structure or a movable frame structure having a single rotation axis. The fixed frame structure has only one structural status, so it occupies a relatively large space, which is inconvenient to storage. The movable frame structure can rotate to reduce an occupied space for convenience to storage, but the thickness of the movable frame structure is usually larger than the thickness of the tablet computer so that the movable frame structure can support the tablet computer stably. However, it is difficult to reduce the whole thickness of the movable frame structure or an input device combined with the movable frame structure even after folded, leading to obstruction to storing the above devices. In addition, the supporting structure usually supports a side edge of the tablet computer (especially a lower side edge). Because the tablet computer is quite heavy so that the above supporting device or input device combined with a supporting structure are weighted for an equilibrium so as to prevent the tablet from falling down. The weighting is executed usually by increasing the thickness of a base of the above supporting device or input device combined with a supporting structure so that a torque produced by the gravity force of the tablet computer can be balanced. However, the weighting also increases the weight and thickness of the above supporting device or input device combined with a supporting structure, leading to obstruction to reducing the volume for storage.

SUMMARY OF THE INVENTION

An objective of the invention is to provide a supporting device. The supporting device is used for supporting a tabular electronic device and uses a multi-axis rotation mechanism so that unfolding and folding of the supporting device is more flexible and the whole thickness of the supporting device after folded can avoid being restrained by the thickness of the tabular electronic device.

The supporting device of the invention includes a base, a connecting member, and a supporting member. The connecting member is pivotally connected to the base. The connecting member is capable of rotating relative to the base about a first rotation axis. The supporting member is pivotally connected to the connecting member. The supporting member is capable of rotating relative to the connecting member about a second rotation axis. The first rotation axis and the second rotation axis are nonparallel. The supporting member has an accommodating slot. Therein, the supporting device supports a tabular electronic device by a side edge portion of the tabular electronic device being accommodated in the accommodating slot. Thereby, the supporting member has two rotation dimensions relative to the base through the connecting member, so that unfolding and folding of the supporting member relative to the base is more flexible. Furthermore, the folding mechanism of the supporting member can be designed properly so that the whole thickness of the supporting device after folded can avoid being restrained by the thickness of the tabular electronic device, which is conducive to the storage of the supporting device.

Another objective of the invention is to provide a portable electronic apparatus assembly. The portable electronic apparatus assembly uses a supporting device of the invention to support a tabular electronic device, which is conducive to the storage of the portable electronic apparatus assembly.

The portable electronic apparatus assembly of the invention includes a tabular electronic device and a supporting device. The tabular electronic device has a display screen and a side edge portion. The supporting device includes a base, a connecting member, and a supporting member. The connecting member is pivotally connected to the base. The connecting member is capable of rotating relative to the base about a first rotation axis. The supporting member is pivotally connected to the connecting member. The supporting member is capable of rotating relative to the connecting member about a second rotation axis. The first rotation axis and the second rotation axis are nonparallel. The supporting member has an accommodating slot. Therein, the supporting device supports the tabular electronic device obliquely by the side edge portion being accommodated in the accommodating slot, so that the display screen is disposed with facing upward. Similarly, the supporting member has two rotation dimensions relative to the base through the connecting member, so that unfolding and folding of the supporting member relative to the base is more flexible. Furthermore, the folding mechanism of the supporting member can be designed properly so that the whole thickness of the supporting device after folded can avoid being restrained by the thickness of the tabular electronic device, which is conducive to the storage of the supporting device (or the portable electronic apparatus assembly).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
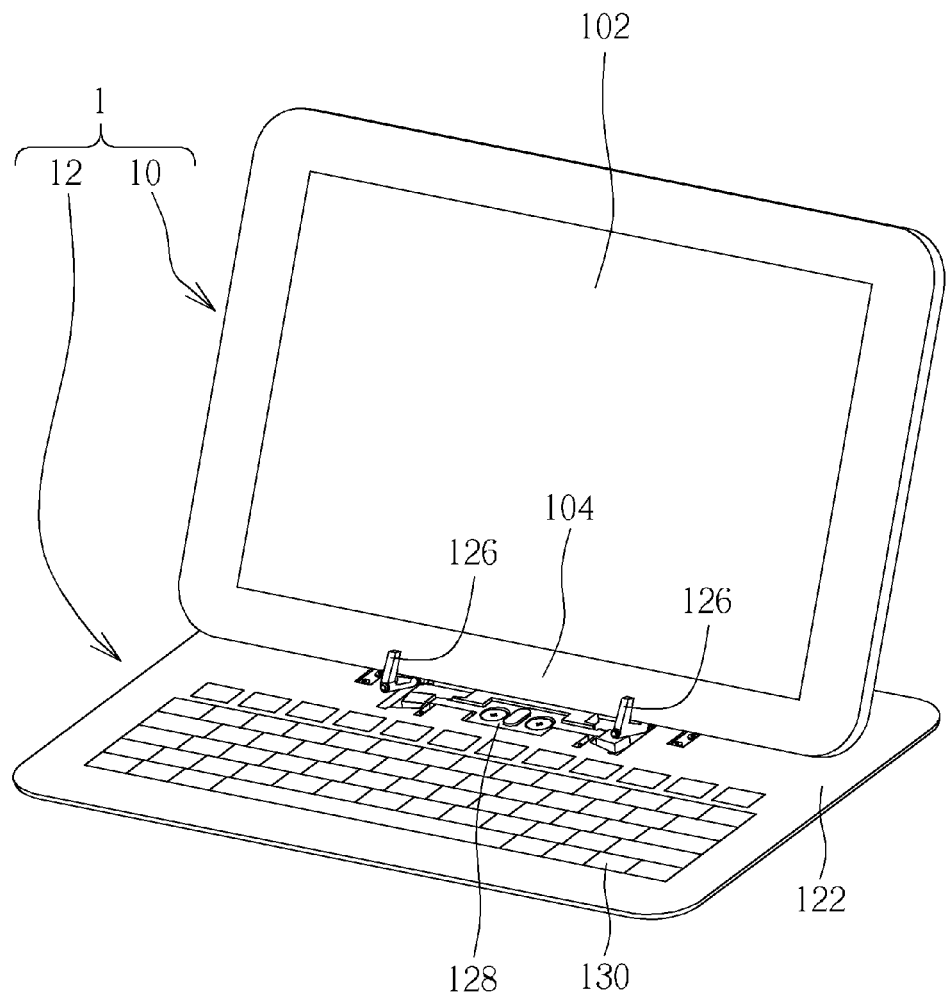
FIG. 1 is a schematic diagram illustrating a portable electronic apparatus assembly of a preferred embodiment according to the invention.
Figure 2:
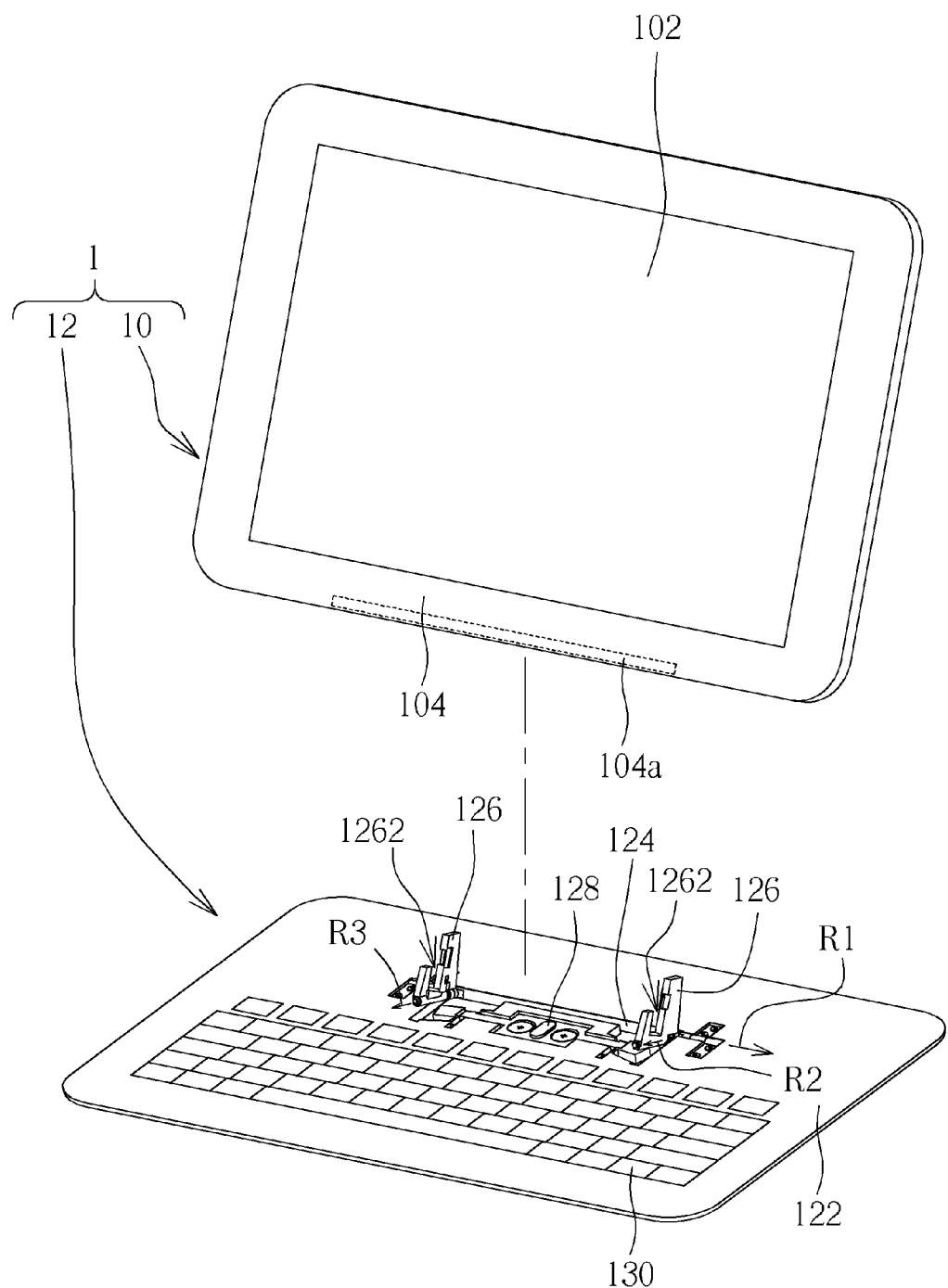
FIG. 2 is an exploded view of the portable electronic apparatus assembly in FIG. 1.

Please refer to FIG. 1 and FIG. 2. FIG. 1 is a schematic diagram illustrating a portable electronic apparatus assembly 1 of a preferred embodiment according to the invention. FIG. 2 is an exploded view of the portable electronic apparatus assembly 1. The portable electronic apparatus assembly 1 includes a tabular electronic device 10 and a supporting device 12. The tabular electronic device 10 has a display screen 102 and a side edge portion 104. In the embodiment, the tabular electronic device 10 is but not limited to a tablet computer, a smart phone, a digital photo frame, or a tabular display. The side edge portion 104 is located at the circumference of the whole structure of the tabular electronic device 10. The supporting device 12 includes a base 122, a connecting member 124, two supporting members 126, a locking mechanism 128, and a peripheral device 130. The connecting member 124 is pivotally connected to the base 122. The connecting member 124 is capable of rotating relative to the base 122 about a first rotation axis R1. The supporting members 126 are pivotally connected to the connecting member 124. The two supporting members 126 are capable of rotating relative to the connecting member 124 about a second rotation axis R2 and a third rotation axis R3 respectively. The first rotation axis R1 is not parallel to the second rotation axis R2 and the third rotation axis R3. Thereby, the supporting member 126 has two rotation dimensions relative to the base 122 through the connecting member 124. In the embodiment, the first rotation axis R1 is perpendicular to the second rotation axis R2 and the third rotation axis R3; that is, the second rotation axis R2 and the third rotation axis R3 are parallel. However, the invention is not limited thereto. Furthermore, in the embodiment, the two supporting members 126 are disposed structurally symmetrically. The movement mechanisms of the two supporting members are the same. Therefore, the following description is based only one supporting member 126 and the second rotation axis R2 in principle.

Figure 3:
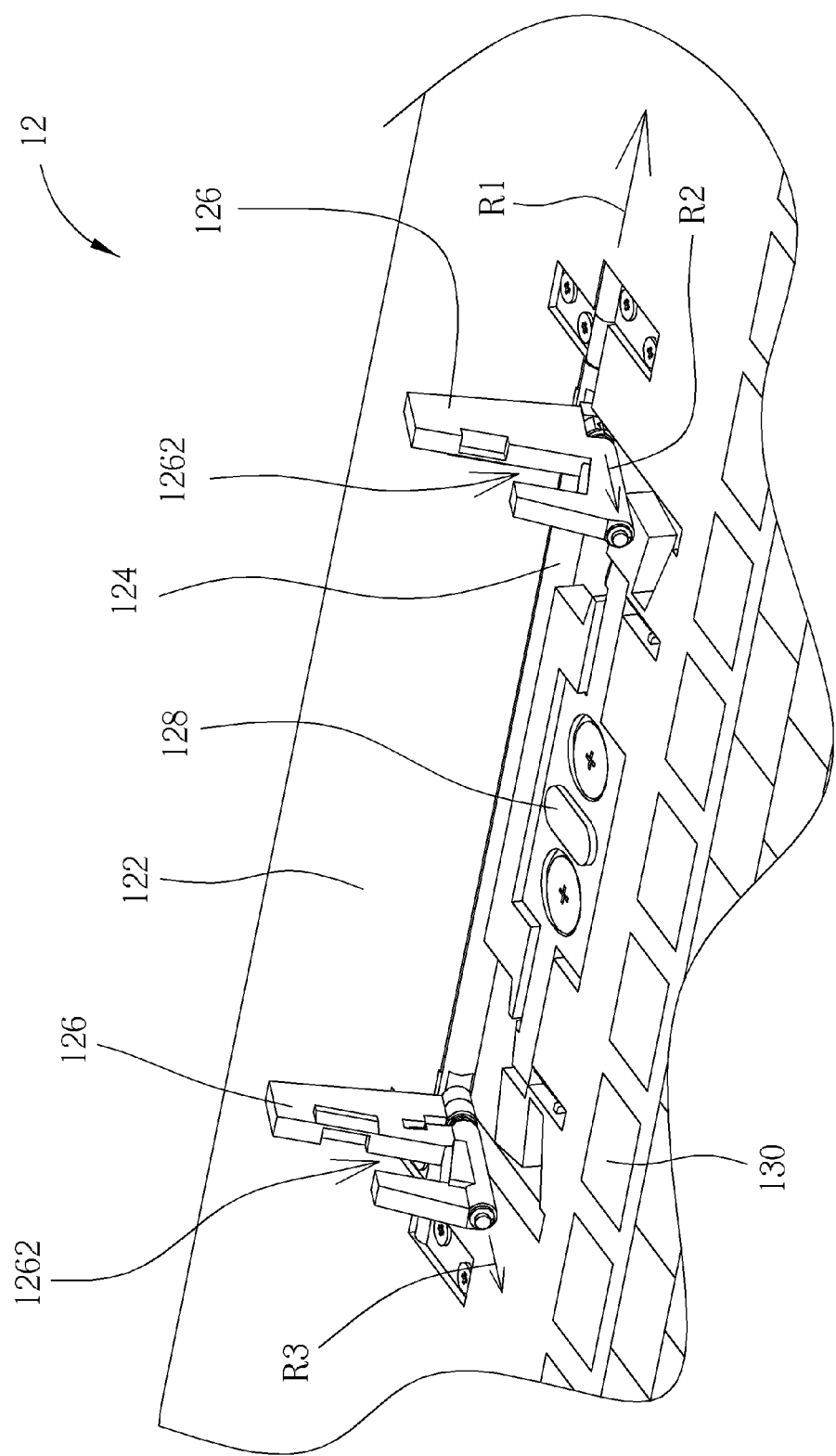
FIG. 3 is an enlarged view of a portion of a supporting device of the portable electronic apparatus assembly in FIG. 2.

Please also refer to FIG. 3. FIG. 3 is an enlarged view of a portion of the supporting device 12. In the embodiment, the supporting member 126 has an accommodating slot 1262. The supporting device 12 supports the tabular electronic device 10 by the side edge portion 104 of the tabular electronic device 10 being accommodated in the accommodating slot 1262. As shown by FIG. 1, the tabular electronic device 10 is obliquely supported, and the display screen 102 is disposed with facing upward. Therein, the angle in which the tabular electronic device 10 is obliquely supported can be adjusted by rotating the supporting members 126 (together with the connecting member 124) so that requirements by different users or for various usage situations can be satisfied. In the embodiment, the accommodating slot 1262 is a U-shaped accommodating slot and has a U-shaped sectional profile, which is conducive to constraining the side edge portion 104 in the accommodating slot 1262 stably. Furthermore, the supporting member 126 includes a magnetic attracting part 1264 disposed at a bottom 1262a of the accommodating slot 1262. If the tabular electronic device 10 includes a magnetic portion 104a (indicated by a rectangle in dashed lines in FIG. 2) at the side edge portion 104, when the side edge portion 104 is accommodated in the accommodating slot 1262, the magnetic attracting part 1264 and the magnetic portion 104a produce a magnetic attraction force therebetween to urge the side edge portion 104 to close to the bottom 1262a more so that the side edge portion 104 is constrained in the accommodating slot 1262 more firmly. That is, the supporting member 126 can support the tabular electronic device 10 more firmly. Therein, for example, the magnetic portion 104a can be realized by a magnet embedded in the side edge portion 104 or by the side edge portion 104 itself being formed of paramagnetic material or material capable of being attracted by a magnet.

Furthermore, the peripheral device 130 is disposed on the base 122. When the tabular electronic device 10 is obliquely supported on the supporting device 12, the peripheral device 130 is located in front of the tabular electronic device 10 (or the display screen 102). In the embodiment, the peripheral device 130 is an input device (e.g. keyboard), but the invention is not limited thereto. In practice, the input device can be a touch pad, an integral input device (including a keyboard and an electronic handwriting board) and so on for example. Furthermore, the peripheral device 130 can be an output device (e.g. speaker, display and so on). The peripheral device 130 and the tabular electronic device 10 can be connected in wire or wireless communication. As shown by FIG. 1, a user can operate the portable electronic apparatus assembly 1 as a notebook computer.

Figure 4:
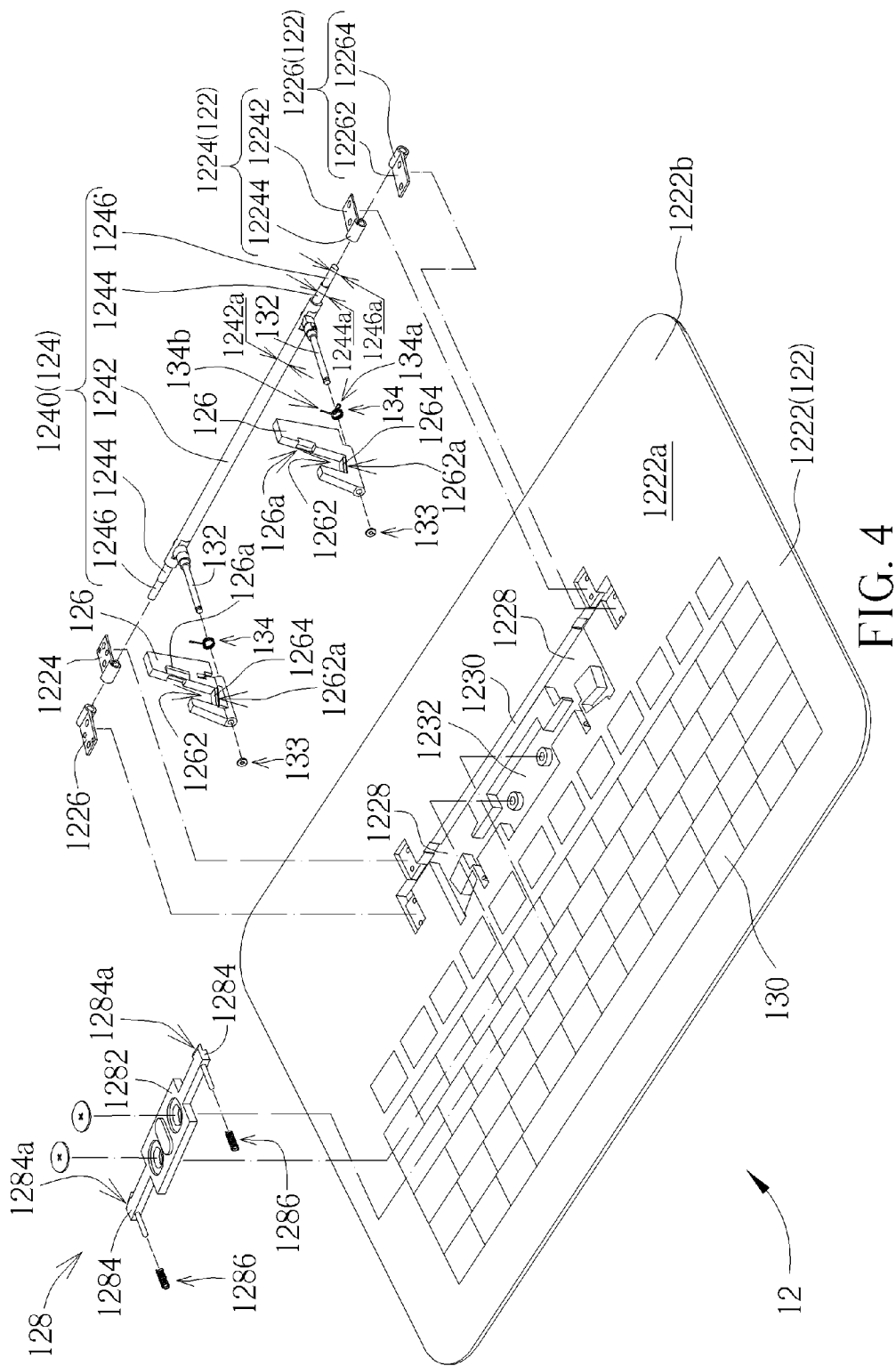
FIG. 4 is an exploded view of the supporting device of the portable electronic apparatus assembly in FIG. 1.
Figure 5:
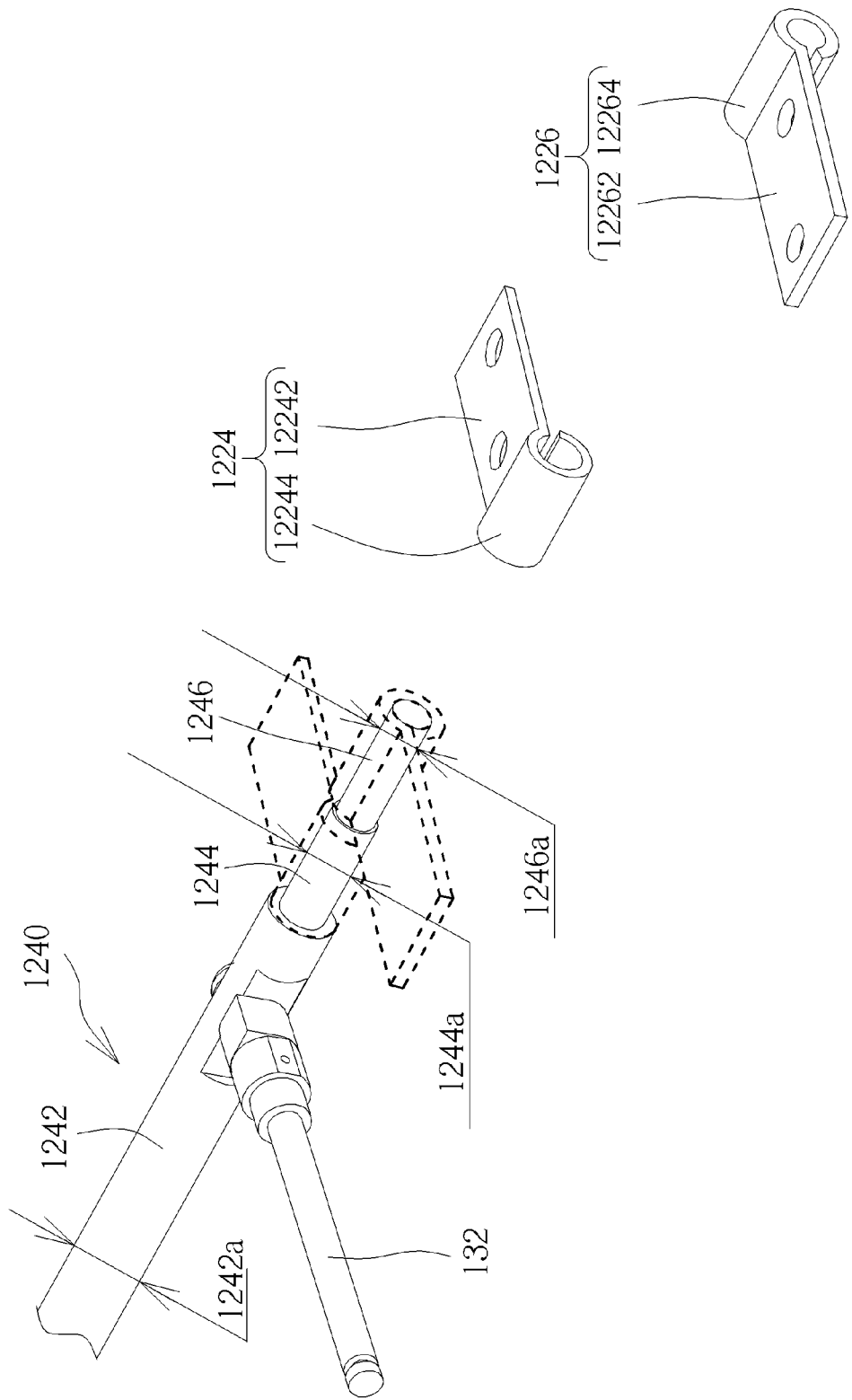
FIG. 5 is a schematic diagram illustrating the assembly of a connecting member with a first pivotal connection socket and a second pivotal connection socket of a base in the supporting device in FIG. 4.

Please also refer to FIG. 4. FIG. 4 is an exploded view of the supporting device 12. The connecting member 124 includes a rotation shaft 1240. The rotation shaft 1240 includes a main portion 1242, tow first pivot portions 1244, and two second pivot portions 1246. The first pivot portions 1244 and the second pivot portions 1246 are connected in pair to two ends of the main portion 1242. The first pivot portion 1244 is connected to and between the main portion 1242 and the second pivot portion 1246. The supporting members 126 are pivotally connected to the main portion 1242. The base 122 includes a plate 1222, two first pivotal connection sockets 1224, and two second pivotal connection sockets 1226. The first pivotal connection socket 1224 and the second pivotal connection socket 1226 are fixed on the plate 1222 and pivotally connected to the first pivot portion 1244 and the second pivot portion 1246 respectively. The first pivotal connection socket 1224 and the second pivotal connection socket 1226 are capable of applying two torques to the rotation shaft 1240 through the first pivot portion 1244 and the second pivot portion 1246 respectively. Please also refer to FIG. 5. FIG. 5 is a schematic diagram illustrating the assembly of the connecting member 124 with the first pivotal connection socket 1224 and the second pivotal connection socket 1226; therein, the assembly positions where the first pivotal connection socket 1224 and the second pivotal connection socket 1226 are assembled to the connecting member 124 are shown by dashed lines. In the embodiment, the first pivotal connection socket 1224 includes a fixed part 12242 and a pivotal connection part 12244 connected to the fixed part 12242. The second pivotal connection socket 1226 includes a fixed part 12262 and a pivotal connection part 12264 connected to the fixed part 12262. The fixed parts 12242 and 12262 are oppositely fixed relative to the rotation shaft 1240 on the plate 1222. The pivotal connection parts 12244 and 12264 are sleeved on the first pivot portion 1244 and the second pivot portion 1246 respectively. Thereby, by frictional force, the pivotal connection parts 12244 and 12264 is capable of applying the two torques to the rotation shaft 1240 through the first pivot portion 1244 and the second pivot portion 1246 respectively.

Furthermore, an accumulation of the two torques applied to the rotation shaft 1240 by the pivotal connection parts 12244 and 12264 is balanced with a torque applied to the rotation shaft 1240 through the supporting member 126 by the tabular electronic device 10 supported by the supporting member 126. Therefore, using the pivotal connection sockets 1224 and 1226 to share a required torque can avoid that applying the required torque through only one pivotal connection socket usually leads to a large structure of the pivotal connection socket. In the embodiment, the rotation shaft 1240 has a step structure at each end thereof. The first pivot portion 1244 has a first shaft diameter 1244a. The second pivot portion 1246 has a second shaft diameter 1246a. The main portion 1242 has a third shaft diameter 1242a. The third shaft diameter 1242a is larger than the first shaft diameter 1244a. The first shaft diameter 1244a is larger than the second shaft diameter 1246a. Therefore, the first pivot portion 1244 allows of transferring a torque larger than that the second pivot portion 1246 can transfer. The torques applied through the first pivot portion 1244 and the second pivot portion 1246 by the first pivotal connection socket 1224 and the second pivotal connection socket 1226 respectively are accumulated and transferred to the main portion 1242 through the first pivot portion 1244 so that the transferred torque is balanced with the torque applied to the rotation shaft 1240 by the tabular electronic device 10. In addition, that the rotation shaft 1240 is pivotally connected to the pivotal connection parts 12244 and 12264 is conducive to the stability of the pivotal connections. Furthermore, that the fixed parts 12242 and 12262 are fixed at two opposite sides of the rotation shaft 1240 also is conducive to the maintenance of the connection strength of the pivotal connection sockets 1224 and 1226 with the base 122 during rotating of the rotation shaft 1240.

Figure 6:
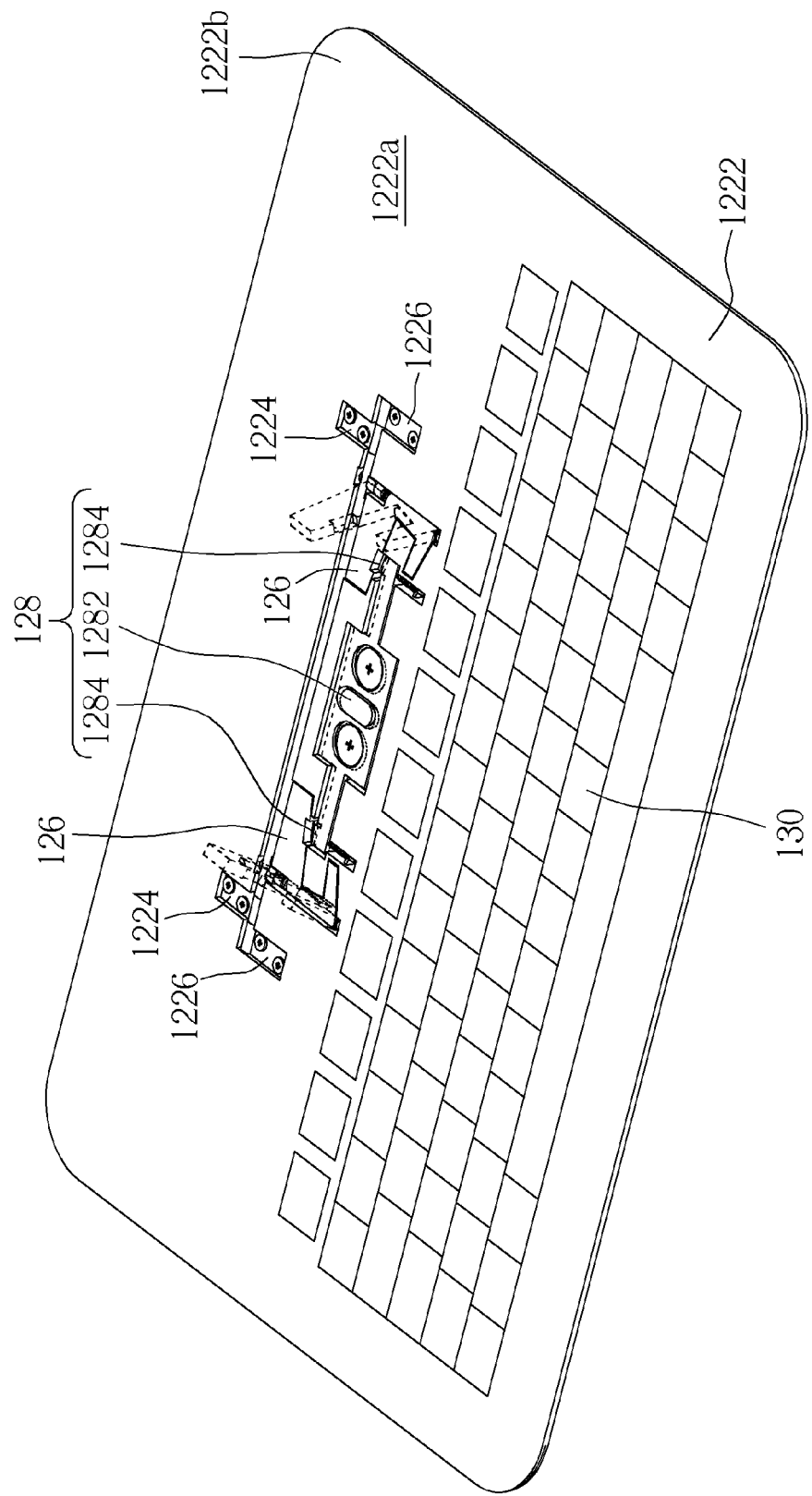
FIG. 6 is a schematic diagram illustrating the folding of the supporting device of the portable electronic apparatus assembly in FIG. 1.

The supporting device 12 further includes two pivot shafts 132. The two supporting members 126 are pivotally connected to the connecting member 124 through the two pivot shafts 132 respectively. Therein, the pivot shafts 132 are connected to the main portion 1242 of the rotation shaft 1240. The pivot shaft 132 can rotate together with the rotation shaft 1240. The supporting member 126 is sleeved on the pivot shaft 132 so that the supporting member 126 is capable of rotating relative to the pivot shaft 132 (or the rotation shaft 1240). In the embodiment, the pivot shaft 132 thereon clips a C-ring 133 for constraining the supporting member 126 on the pivot shaft 132 stably. Furthermore, the base 122 includes two accommodating recesses 1228 formed on the plate 1222 corresponding to the two supporting members 126. The supporting member 126 is capable of being accommodated in the corresponding accommodating recess 1228 by rotating the connecting member 124 relative to the base 122 about the first rotation axis R1 and rotating the supporting member 126 relative to the connecting member 124 about the second rotation axis R2. In other words, the supporting member 126 is accommodated in the corresponding accommodating recess 1228 by rotating the rotation shaft 1240 so that the supporting member 126 is close to the plate 1222, and then by rotating the supporting member 126 relative to the pivot shaft 132, as shown by the solid lines in FIG. 6.

The locking mechanism 128 is disposed on the base 122 and includes a manipulation part 1282, two holding parts 1284 connected to the manipulation part 1282, and two return springs 1286. The manipulation part 1282 is slidably disposed on the plate 1222. The two holding parts 1284 are disposed corresponding to the two supporting member 126 respectively. The return springs 1286 are compressed and disposed between the manipulation part 1282 and the plate 1222 corresponding to the two holding parts 1284. Thereby, the manipulation part 1282 is operable to lock or unlock the two supporting members 126 through the two holding parts 1284 respectively. Therein, the return spring 1286 provides a resilient force to urge the manipulation part 1282 to slide so that the holding part 1284 extends into the corresponding accommodating recess 1228. The holding part 1284 that extends into the corresponding accommodating recess 1228 can block the supporting member 126 accommodated in the corresponding accommodating recess 1228 so that the supporting member 126 is kept accommodated in the corresponding accommodating recess 1228, i.e. the supporting member 126 being locked by the corresponding holding part 1284. If the user wants to the supporting member 126 to rotate out from the corresponding accommodating recess 1228, the user can slide the manipulation part 1282 so that the holding part 1284 slides out the accommodating recess 1228 and unlocks the corresponding supporting member 126. At the moment, the supporting member 126 is then capable of rotating out from the corresponding accommodating recess 1228, as shown in dashed lines in FIG. 6.

In the embodiment, the supporting device 12 further includes two torsion springs 134 sleeved on the two pivot shafts 132 respectively. Two end portions 134a and 134b of the torsion spring 134 are connected to the corresponding pivot shaft 132 and the corresponding supporting member 126 respectively. The torsion spring 134 is twisted and produces a resilient force during the supporting member 126 being rotated to be accommodated in the corresponding accommodating recess 1228. The resilient force urges the supporting member 126 to rotate out the accommodating recess 1228 so that after the user manipulates the locking mechanism 128 to unlock the supporting member 126 (for example by sliding the manipulation part 1282 to disengage the holding part 1284 from the supporting member 126), the supporting member 126 can automatically rotate out the corresponding accommodating recess 1228 to a proper position under the resilient force. Then, the user can make the side edge portion 104 of the tabular electronic device 10 be accommodated in the accommodating slots 1262, and the operation of using the supporting device 12 to support the tabular electronic device 10 (as shown by FIG. 1). The design for the above proper position can be achieved by the torsion spring 134 or other constraint structure (for example a constraint post disposed on the pivot shaft 132), which will not described further.

When the portable electronic apparatus assembly 1 is required to be stored, the user can draw out the tabular electronic device 10 from the accommodating slots 1262 and then rotate the supporting members 126 into the accommodating recesses 1228 correspondingly. By using a slanted surface 1284a of the holding part 1284, during the supporting member 126 rotating into the corresponding accommodating recess 1228, an edge 126a of the supporting member 126 slides on the slanted surface 1284a so that the holding part 1284 and the manipulation part 1282 move and the return spring 1286 is compressed. After the supporting member 126 rotates into the corresponding accommodating recess 1228, a resilient force produced by the compressed return spring 1286 urges the holding part 1284 and the manipulation part 1282 to slide back to the original position so that the holding part 1284 constrains the supporting member 126 in the corresponding accommodating recess 1228. Therefore, the supporting member 126 is locked by the holding part 1284 (as shown by the solid lines in FIG. 6). Furthermore, the base 122 also includes two accommodating spaces 1230 and 1232. The accommodating space 1230 is used for the connecting member 124 and the pivotal connection sockets 1224 and 1226 to be disposed therein. The accommodating space 1232 is used for the locking mechanism 128 to be disposed therein so as not to protrude out the plate 1222. Thereby, the thickness of the supporting device 12 after folded is substantially equal to the thickness of the plate 1222, so that it is easy to stack up the folded supporting device 12 and the tabular electronic device 10 for storage without wasting space.

In addition, for a simple description, the base 122 thereon defines an operation plane 1222a, i.e. the top surface of the plate 1222. The first rotation axis R1 is parallel to the operation plane 1222a. The supporting member 126 is a tabular member. The supporting member 126 is not perpendicular to the operation plane 1222a when the supporting member 126 supports the tabular electronic device 10. In the embodiment, when the supporting member 126 is disposed for supporting the tabular electronic device 10, the supporting member 126 slants toward the corresponding accommodating recess 1228. Such structural character is conducive to folding the supporting device 12. For example, when the user stacks the tabular electronic device 1 toward the plate 1222, the tabular electronic device 10 simultaneously contacts and rotates the two supporting members 126 so as to be accommodated in the accommodating recesses 1228 correspondingly. In addition, in the embodiment, the supporting device 12 uses two structurally symmetrical supporting members 126 so that the two supporting members 126 are rotated in or out the accommodating recesses 1228 oppositely. However, the invention is not limited thereto. For example, the two supporting members 126 can be designed to be rotated in or out the accommodating recesses 1228 in the same direction. For example, the supporting device 12 can be designed to use only one supporting member. If the supporting member is thick enough, the supporting member still has the effect of supporting the electronic device 10. Furthermore, in the embodiment, the second rotation axes R2 of the two supporting member 126 are parallel to each other and perpendicular to the first rotation axis R1, but the invention is not limited thereto. For example, the rotation axes of the two supporting members 126 relative to the connecting member 124 are not parallel to each other and each rotation axis is not perpendicular to the first rotation axis R1.

Figure 7:
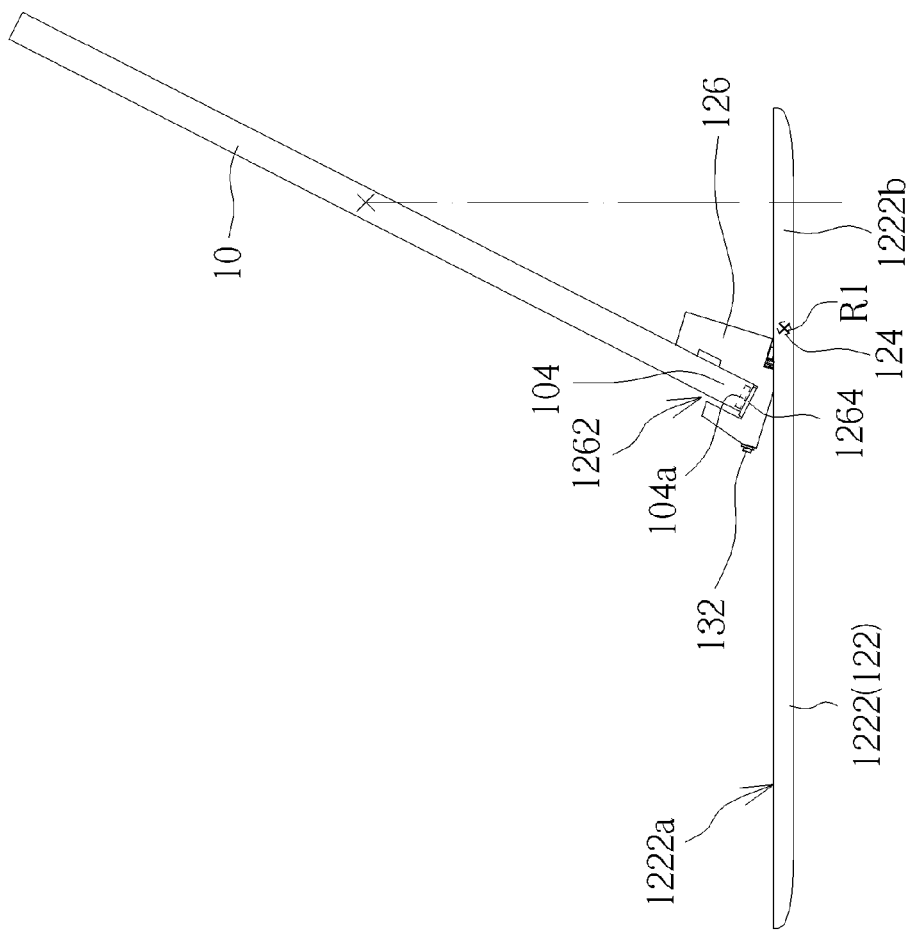
FIG. 7 is a side view of the portable electronic apparatus assembly in FIG. 1.
Figure 8:
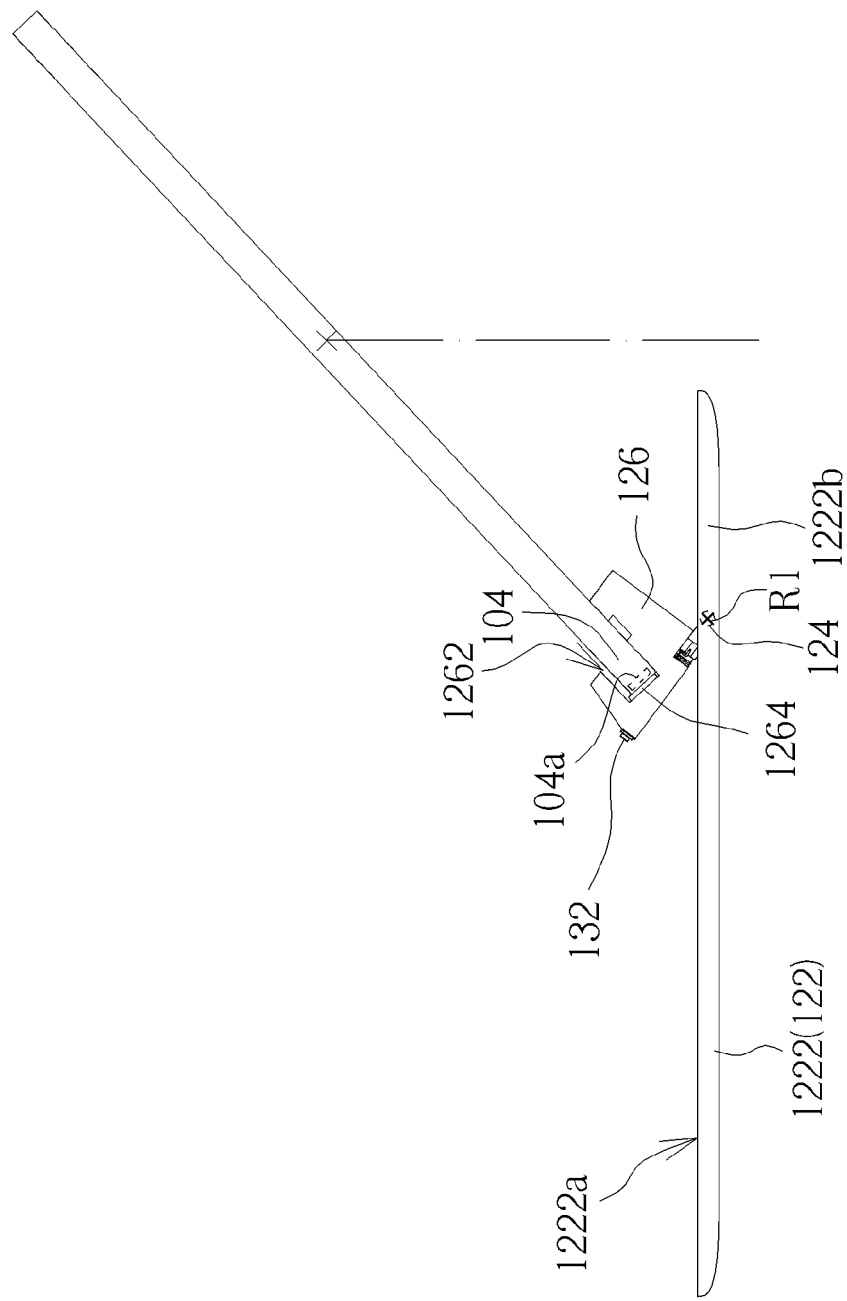
FIG. 8 is a side view of the portable electronic apparatus assembly in FIG. 7 with the tabular electronic device being disposed more obliquely.

Please refer to FIG. 7, which is a side view of the supporting device 12 supporting the tabular electronic device 10. When the supporting device 12 supports the tabular electronic device 10, the center of gravity (indicated by a cross mark in FIG. 7) of the tabular electronic device 10 applies the torque to the rotation shaft 1240 (indicated by a dashed circle in FIG. 7) through the supporting member 126 is balanced with the torques applied to the rotation shaft 1240 by the pivotal connection parts 12244 and 12264 (not shown in FIG. 7 for a simple drawing), referring to the above relative descriptions. In other words, the three torques are balanced, so that the supporting device 12 supports the tabular electronic device 10 stably. In the embodiment, the plate 1222 of the base 122 has a structural portion 1222b located under the tabular electronic device 10. When the supporting device 12 supports the tabular electronic device 10, the line of gravity of the tabular electronic device 10 (i.e. an imaginary line passing through the center of gravity and extending along the direction of gravity, as shown by a center line in FIG. 7) and the structural portion 1222b are located at the same side (e.g. the right side in the viewpoint of FIG. 7) of the first rotation axis R1 (indicated by a cross mark in FIG. 7). Therefore, the structural portion 1222b can change the position of a fulcrum about which the whole of the supporting device 12 and the tabular electronic device 10 falls down. In the embodiment, the line of gravity of the tabular electronic device 10 passes through the structural portion 1222b, so the supporting device 12 can support the tabular electronic device 10 firmly without falling down. As shown by FIG. 8, when the tabular electronic device 10 is supported more obliquely relative to the supporting device 12, the line of gravity of the tabular electronic device 10 is out of the structural portion 1222b. Because a distance between the line of gravity and the fulcrum of falling down is still much smaller than a distance between the center of gravity of the supporting device 12 (even adding the peripheral device 130) and the fulcrum of falling down, under the effect of the weight of the supporting device 12 (adding the peripheral device 130), it is still uneasy for the tabular electronic device 10 to fall down.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting device, comprising:
a base having an accommodating space;
a connecting member pivotally connected to the base about a first rotation axis, the connecting member being rotatable relative to the base about the first rotation axis; and
a supporting member directly pivotally connected to the connecting member about a second rotation axis such that the supporting member is rotatable relative to the connecting member about the second rotation axis, the first rotation axis and the second rotation axis being non-parallel, the supporting member having an accommodating slot, wherein the supporting device supports a tabular electronic device by a side edge portion of the tabular electronic device being accommodated in the accommodating slot, and the connecting member is wholly disposed in the accommodating space when the supporting device supports the tabular electronic device.

2. The supporting device of claim 1, wherein the base has an accommodating recess, and the supporting member is accommodated in the accommodating recess by rotating the connecting member relative to the base about the first rotation axis and rotating the supporting member relative to the connecting member about the second rotation axis.

3. The supporting device of claim 2, wherein the base thereon defines an operation plane, the operation plane is parallel to the first rotation axis, the supporting member is a tabular member, and the supporting member is disposed not perpendicular to the operation plane when the supporting member supports the tabular electronic device.

4. The supporting device of claim 2, further comprising a locking mechanism disposed on the base, the locking mechanism comprising a manipulation part and a holding part connected to the manipulation part, wherein when the supporting member is accommodated in the accommodating recess of the base, the manipulation part is operable to lock or unlock the supporting member through the holding part.

5. The supporting device of claim 4, further comprising a pivot shaft and a torsion spring, the supporting member being pivotally connected to the connecting member through the pivot shaft, the torsion spring being sleeved on the pivot shaft, two end portions of the torsion spring being connected to the pivot shaft and the supporting member respectively, wherein the torsion spring is twisted and produces a resilient force during the supporting member being rotated to be accommodated in the accommodating recess of the base, and the resilient force urges the supporting member to rotate out the accommodating recess of the base.

6. The supporting device of claim 1, further comprising another supporting member pivotally connected to the connecting member about a third rotation axis, the another supporting member being rotatable relative to the connecting member about the third rotation axis and having an accommodating slot, the first rotation axis and the third rotation axis being nonparallel, wherein the supporting device supports the tabular electronic device by the side edge portion of the tabular electronic device being accommodated simultaneously in the two accommodating slots of the two supporting member.

7. The supporting device of claim 6, further comprising a locking mechanism disposed on the base, the locking mechanism comprising a manipulation part and two holding parts connected to the manipulation part, the two holding parts being disposed corresponding to the two supporting member respectively, the manipulation part being operable to lock or unlock the two supporting member through the two holding parts respectively.

8. The supporting device of claim 1, wherein the base comprises a first pivotal connection socket and a second pivotal connection socket, the connecting member comprises a rotation shaft, the rotation shaft comprises a main portion, a first pivot portion, and a second pivot portion, the first pivot portion being connected to and between the main portion and the second pivot portion, the supporting member is pivotally connected to the main portion, the first pivot portion has a first shaft diameter, the second pivot portion has a second shaft diameter, the first shaft diameter is larger than the second shaft diameter, the first pivotal connection socket is pivotally connected to the first pivot portion and applies a torque to the rotation shaft through the first pivot portion when the tabular electronic device is supported by the supporting member, and the second pivotal connection socket is pivotally connected to the second pivot portion and applies a torque to the rotation shaft through the second pivot portion when the tabular electronic device is supported by the supporting member.

9. The supporting device of claim 8, wherein the main portion has a third shaft diameter, and the third shaft diameter is larger than the first shaft diameter.

10. The supporting device of claim 8, wherein each of the first pivotal connection socket and the second pivotal connection socket has a fixed part and a pivotal connection part connected to the fixed part, the fixed part of the first pivotal connection socket and the fixed part of the second pivotal connection socket are oppositely disposed relative to the rotation shaft, and the pivotal connection part of the first pivotal connection socket and the pivotal connection part of the second pivotal connection socket are sleeved on the first pivot portion and the second pivot portion respectively.

11. The supporting device of claim 1, further comprising a peripheral device disposed on the base, wherein when the supporting device supports the tabular electronic device, the peripheral device is located in front of the tabular electronic device.

12. The supporting device of claim 1, wherein the first rotation axis is perpendicular to the second rotation axis.

13. The supporting device of claim 1, wherein the accommodating slot has a U-shaped sectional profile.

14. The supporting device of claim 13, wherein the supporting member comprises a magnetic attracting part disposed at a bottom of the accommodating slot.

15. The supporting device of claim 1, wherein the base has a structural portion, and when the supporting device supports the tabular electronic device, a line of gravity of the tabular electronic device and the structural portion are located at the same side of the first rotation axis.

16. A portable electronic apparatus assembly, comprising:
a tabular electronic device having a display screen and a side edge portion; and
a supporting device, comprising:
a base having an accommodating space;
a connecting member pivotally connected to the base about a first rotation axis, the connecting member being rotatable relative to the base about the first rotation axis; and
a supporting member directly pivotally connected to the connecting member about a second rotation axis such that the supporting member is rotatable relative to the connecting member about the second rotation axis, the first rotation axis and the second rotation axis being non-parallel, the supporting member having an accommodating slot, wherein the supporting device supports the tabular electronic device obliquely by the side edge portion being accommodated in the accommodating slot, and the connecting member is wholly disposed in the accommodating space when the supporting device supports the tabular electronic device.

17. The portable electronic apparatus assembly of claim 16, wherein the base has an accommodating recess, the supporting member is accommodated in the accommodating recess by rotating the connecting member relative to the base about the first rotation axis and rotating the supporting member relative to the connecting member about the second rotation axis, the supporting device comprises a locking mechanism, a pivot shaft, and a torsion spring, the locking mechanism is disposed on the base and comprises a manipulation part and a holding part connected to the manipulation part, the supporting member is pivotally connected to the connecting member through the pivot shaft, the torsion spring is sleeved on the pivot shaft, two end portions of the torsion spring are connected to the pivot shaft and the supporting member respectively, the torsion spring is twisted and produces a resilient force during the supporting member being rotated to be accommodated in the accommodating recess of the base, the resilient force urges the supporting member to rotate out the accommodating recess of the base, and when the supporting member is accommodated in the accommodating recess of the base, the manipulation part is operable to lock or unlock the supporting member through the holding part.

18. The portable electronic apparatus assembly of claim 16, wherein the base comprises a first pivotal connection socket and a second pivotal connection socket, the connecting member comprises a rotation shaft, the rotation shaft comprises a main portion, a first pivot portion, and a second pivot portion, the first pivot portion being connected to and between the main portion and the second pivot portion, the supporting member is pivotally connected to the main portion, the first pivot portion has a first shaft diameter, the second pivot portion has a second shaft diameter, the first shaft diameter is larger than the second shaft diameter, the first pivotal connection socket is pivotally connected to the first pivot portion and applies a torque to the rotation shaft through the first pivot portion when the tabular electronic device is supported by the supporting member, the second pivotal connection socket is pivotally connected to the second pivot portion and applies a torque to the rotation shaft through the second pivot portion when the tabular electronic device is supported by the supporting member, the tabular electronic device applies a torque to the rotation shaft through the supporting member when the tabular electronic device is supported by the supporting member, and the three torques are balanced so that the supporting device supports the tabular electronic device stably.

19. The portable electronic apparatus assembly of claim 18, wherein each of the first pivotal connection socket and the second pivotal connection socket has a fixed part and a pivotal connection part connected to the fixed part, the fixed part of the first pivotal connection socket and the fixed part of the second pivotal connection socket are oppositely disposed relative to the rotation shaft, and the pivotal connection part of the first pivotal connection socket and the pivotal connection part of the second pivotal connection socket are sleeved on the first pivot portion and the second pivot portion respectively.

* * * * *